United States Patent
Park (10) Patent No.: US 8,891,938 B2
(45) Date of Patent: Nov. 18, 2014

(54) METHODS OF PLAYING/RECORDING MOVING PICTURE USING CAPTION SEARCH AND IMAGE PROCESSING APPARATUSES EMPLOYING THE METHOD

(75) Inventor: Seung-Keun Park, Seongnam (KR)

(73) Assignee: KT Corporation, Kyeonggi-Do (KR)

( * ) Notice: Subject to any disclaimer, the term of this patent is extended or adjusted under 35 U.S.C. 154(b) by 1150 days.

(21) Appl. No.: 12/078,113

(22) Filed: Mar. 27, 2008

(65) Prior Publication Data

US 2009/0067812 A1   Mar. 12, 2009

(30) Foreign Application Priority Data

Sep. 6, 2007 (KR) .......... 10-2007-0090453
Sep. 14, 2007 (KR) .......... 10-2007-0093540

(51) Int. Cl.
*H04N 9/80* (2006.01)
*H04N 7/08* (2006.01)
*G11B 27/10* (2006.01)
*H04N 9/82* (2006.01)
*H04N 21/435* (2011.01)
*G11B 27/02* (2006.01)

(52) U.S. Cl.
CPC *H04N 7/08* (2013.01); *G11B 27/02* (2013.01); *G11B 27/105* (2013.01); *H04N 9/8233* (2013.01); *H04N 21/435* (2013.01)
USPC .......................................... 386/248; 386/241

(58) Field of Classification Search
CPC .......... G11B 27/02; G11B 27/105; G11B 2020/10962; H04N 9/8233; H04N 21/435; H04N 7/08
USPC ................................ 386/241, 248; 704/8
See application file for complete search history.

(56) References Cited

U.S. PATENT DOCUMENTS

| 5,572,260 A | * | 11/1996 | Onishi et al. .......... 348/460 |
| 6,292,620 B1 | * | 9/2001 | Ohmori et al. .......... 386/281 |
| 6,430,357 B1 | * | 8/2002 | Orr ........................ 386/244 |
| 6,477,315 B1 | * | 11/2002 | Ohomori .............. 386/281 |
| 6,754,435 B2 | * | 6/2004 | Kim ...................... 386/241 |

(Continued)

OTHER PUBLICATIONS

Sumiya, Kazutoshi; Munisamy, Mahendren; Tanaka, Katsumi; "TV2Web: Generating and Browsing Web with Multiple LOD from Video Streams and their Metadata", International Conference on Informatics Research for Development of Knowledge Society Infrastructure, Mar. 1-2, 2004, pp. 158-167.*

(Continued)

*Primary Examiner* — Victor Lesniewski
(74) *Attorney, Agent, or Firm* — Harness, Dickey & Pierce, P.L.C.

(57) ABSTRACT

Provided are image processing methods and apparatuses for playing/recording a moving picture using caption search, which are capable of easily playing and recording the moving picture from a desired location by searching through captions of the moving picture. The method searches for a caption corresponding to a search key word among captions of the moving picture based on the search key word, displays a search-result list, and records at least one item included in the displayed search-result list according to a selected recording mode. Accordingly, a desired location of the moving picture can be played and/or recorded through caption search. Because the moving picture can be played from a predetermined location using caption search and a user's voice can be recorded and output, efficient foreign-language learning may be possible.

3 Claims, 9 Drawing Sheets

(56) References Cited

U.S. PATENT DOCUMENTS

| | | | |
|---|---|---|---|
| 7,149,690 B2* | 12/2006 | August et al. | 704/270 |
| 7,248,783 B2* | 7/2007 | Hisatomi et al. | 386/241 |
| 7,493,018 B2* | 2/2009 | Kim | 386/241 |
| 7,512,314 B2* | 3/2009 | Ikegami et al. | 386/291 |
| 7,551,834 B2* | 6/2009 | Kashino et al. | 386/343 |
| 7,577,334 B2* | 8/2009 | Kashino et al. | 386/343 |
| 7,697,825 B2* | 4/2010 | Chen et al. | 386/244 |
| 7,945,847 B2* | 5/2011 | Bodin et al. | 715/203 |
| 8,019,197 B2* | 9/2011 | Okada et al. | 386/248 |
| 8,312,490 B2* | 11/2012 | Yap et al. | 725/58 |
| 8,625,960 B2* | 1/2014 | Chun et al. | 386/241 |
| 2001/0033343 A1* | 10/2001 | Yap et al. | 348/734 |
| 2002/0059303 A1* | 5/2002 | Ohmori et al. | 707/104.1 |
| 2002/0104088 A1* | 8/2002 | McGee et al. | 725/51 |
| 2004/0120227 A1* | 6/2004 | Han et al. | 369/30.25 |
| 2004/0179817 A1* | 9/2004 | Chou | 386/69 |
| 2004/0268399 A1* | 12/2004 | Asakawa | 725/89 |
| 2006/0031885 A1* | 2/2006 | Colter et al. | 725/61 |
| 2006/0045476 A1* | 3/2006 | Lee | 386/69 |
| 2006/0059520 A1* | 3/2006 | Miyazawa | 725/52 |
| 2006/0239646 A1* | 10/2006 | Kang | 386/95 |
| 2006/0272483 A1* | 12/2006 | Honeywell | 84/609 |
| 2007/0110401 A1* | 5/2007 | Deguchi et al. | 386/95 |
| 2007/0154176 A1* | 7/2007 | Elcock et al. | 386/95 |
| 2008/0066135 A1* | 3/2008 | Brodersen et al. | 725/134 |
| 2010/0146077 A1* | 6/2010 | Davies et al. | 709/219 |

OTHER PUBLICATIONS

Lee, Janghwan; "A Video Browser Based on Closed Caption", IEEE Transactions on Consumer Electronics, vol. 52, Issue 3, Aug. 2006, pp. 1124-1128.*

* cited by examiner

RELATED ART

FIG.1

```
<SYNC Start=39360><P Class=KRCC>
Then
<SYNC Start=40860><P Class=KRCC> 
<SYNC Start=41063><P Class=KRCC>
```
11 — I send a code
```
<SYNC Start=42349><P Class=KRCC>
```
13 — I have checked it <BR>
Thank you
```
<SYNC Start=44549><P Class=KRCC> 
<SYNC Start=50569><P Class=KRCC>
What is my share?
<SYNC Start=52131><P Class=KRCC>
I am sending your share.
<SYNC Start=53631><P Class=KRCC> 
<SYNC Start=73589><P Class=KRCC>
I have just sent.
<SYNC Start=76220><P Class=KRCC>
OK. Thank you.
```

METHODS OF PLAYING/RECORDING MOVING PICTURE USING CAPTION SEARCH AND IMAGE PROCESSING APPARATUSES EMPLOYING THE METHOD

CROSS-REFERENCE TO RELATED APPLICATION

This application claims the benefit of Korean Patent Applications No. 2007-90453, filed on Sep. 6, 2007 and No. 2007-93540, filed on Sep. 14, 2007, which are hereby incorporated by reference as if fully set forth herein.

BACKGROUND OF THE INVENTION

1. Field of the Invention

The present invention relates to methods of playing/recording a moving picture and image processing apparatuses using the same. More particularly, the present invention relates to methods of playing/recording a moving picture using caption search, which can be applied to image processing apparatuses having a function of playing a moving-picture file, and to image processing apparatuses using the method.

2. Discussion of Related Art

Recent developments in processor and memory technology have led to the use of a high-performance base band processor in a portable device. In addition to the base band processor, portable devices include a separate processor for executing a variety of additional application programs. Modern portable devices include a high-capacity internal memory and an external detachable memory.

With the high-performance processor and the high-capacity memory, the portable device is able to support a variety of additional application programs and services, such as digital broadcast, image and moving-picture photographing, multimedia file playback, and mobile Internet service, as well as mobile communication.

When a moving-picture file such as a foreign movie is played by a portable device, translated captions are generally displayed in a predetermined area of a display screen in synchronization with words in the foreign movie.

A general caption consists of a header and a body. The header includes generally setting information about the caption (e.g., font, language, font size, and alignment), and the body includes a translated caption corresponding to words in the movie, and information on a time to display the translated caption.

Figure 1:
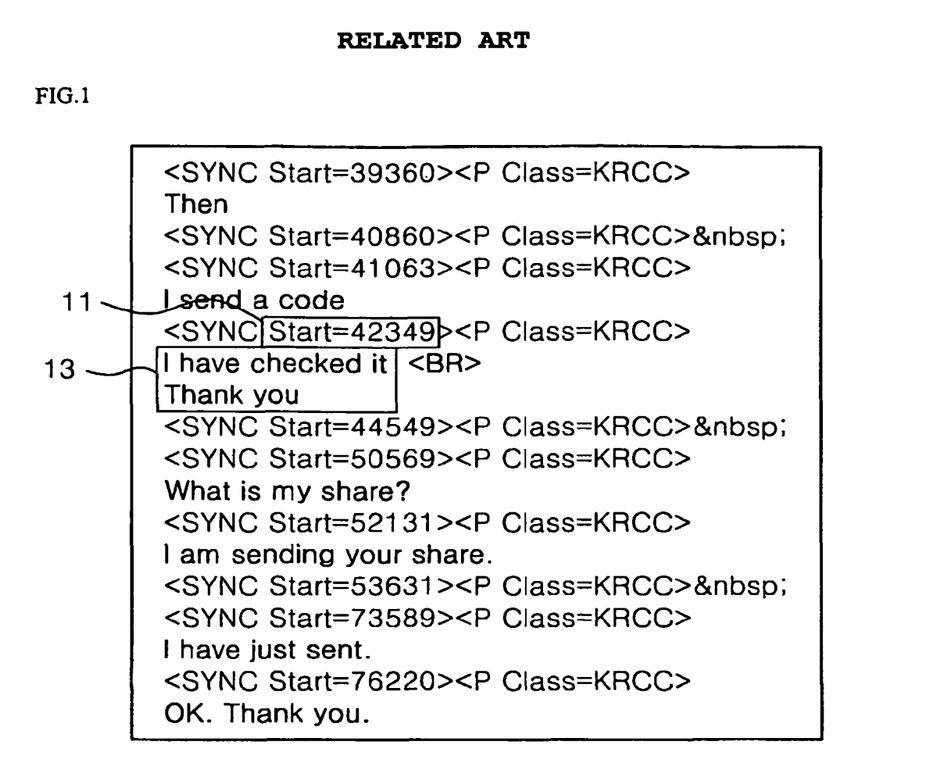
FIG. 1 illustrates contents included in a body of a general caption.

FIG. 1 illustrates contents included in a body of a general caption.

Referring to FIG. 1, the body of the caption includes a play time-point 11 for a moving picture and a caption 13 to be displayed in synchronization with the play time-point 11. For example, the caption 13, "I have checked. Thank you" is displayed in a predetermined area of a display screen at the play time-point 11 of "42349". Here, the play time-point 11 is in a unit of millisecond (ms).

In a conventional method of playing a moving picture using a portable device, the moving picture is played from its start in synchronization with captions, or a user manually designates a start location using a tool (e.g., fast forward or rewind) provided by a moving-picture playback program. For these reasons, the conventional method cannot satisfy users' demands for various functions related with play operation, and there is difficulty in using the moving picture for a variety of purposes such as foreign-language learning.

SUMMARY OF THE INVENTION

The present invention is directed to methods of playing/recording a moving picture using caption search that are capable of easily playing and/or recording the moving picture from a desired location by searching captions of the moving picture.

The present invention is also directed to image processing apparatuses that have a function of playing a moving picture using caption search, are capable of easily playing and recording the moving picture from a desired location.

In some example embodiments, a method of recording a moving picture using a caption search, the method includes: searching for a caption corresponding to a search key word among captions of the moving picture based on the search key word; displaying a search-result list; and recording at least one item included in the displayed search-result list according to a selected recording mode. The recording the at least one item included in the displayed search-result list according to a selected recording mode may include recording all items included in the search-result list while playing the all items when an event instructing full play and record occurs. When the event instructing full play and record occurs, all the items included in the search-result list may be recorded as one moving-picture file. When an event instructing full play and record occurs, a caption included in each item of the search-result list may be mixed with a moving picture corresponding to the caption. The recording at least one item included in the displayed search-result list according to a selected recording mode may include recording, when an event instructing a play and a record occurs, a selected one of the items included in the search-result list while playing the selected item. The method of recording a moving picture using a caption search may further include storing at least one moving picture recorded according to the selected recording mode; and displaying a list of the stored at least one moving picture.

In other example embodiments, a method of playing a moving picture using a caption search includes: searching for a caption corresponding to a search key word among captions of the moving picture based on the search key word; displaying a search-result list; and playing at least one selected item included in the displayed search-result list according to a selected playback mode. The playback mode may include at least one of a repeat play and a sequential play. The playing at least one selected item included in the displayed search-result list according to a selected playback mode may include playing one of the at least one selected item, pausing for a predetermined time, and then playing the next item. The method of playing a moving picture using a caption search may further include recording a user's voice and outputting the recorded user's voice. The method of playing a moving picture using a caption search may further include recording and outputting a user's voice for repetitive foreign-language learning. The searching for a caption corresponding to a search key word among captions of the moving picture may include searching for a play time-point of the moving picture to display the search key word. The displaying the search-result list may include displaying a caption having the search key word and a screen shot corresponding to a play time-point of the moving picture onto which the caption is displayed. The displaying a search-result list may include displaying a caption including the search key word and a play time-point of the moving picture onto which the caption is displayed.

In still other example embodiments, an image processing apparatus having a function of recording a moving picture using caption search includes: a controller configured to search for a caption corresponding to a search key word among captions of the moving picture based on the search key word, configured to display a search-result list, and configured to record at least one item included in the displayed search-result list according to a selected recording mode; and a storage unit configured to store the recorded at least one item. The controller may record, when an event instructing a full play and a record occurs, all items included in the search-result list while playing the items. The controller may record, when the event instructing the full play and the record occurs, all the items included in the search-result list as one moving-picture file. The controller may mix, when the event instructing the full play and the record occurs, a caption included in each item of the search-result list with a moving picture corresponding to the caption. The controller may record, when an event instructing to play a selected item and to record the selected item occurs, a selected item of the items included in the search-result list while playing the selected item.

In still other example embodiments, an image processing apparatus having a function of playing a moving picture using caption search includes : a controller configured to search for a caption corresponding to a search key word among captions of the moving picture based on the search key word, configured to display a search-result list, and configured to play at least one selected item included in the displayed search-result list according to a selected playback mode; and a display unit configured to display the search-result list provided from the controller. The playback mode may include at least one of a repeat play and a sequential play. The controller may play one of the at least one selected item, may pause for a predetermined time, and then may play the next item. The controller may record a user's voice and may output the recorded user's voice. The controller may provide the display unit with a caption including the search key word and a screen shot corresponding to a play time-point of the moving picture onto which the caption is displayed.

BRIEF DESCRIPTION OF THE DRAWINGS

The above and other objects, features and advantages of the present invention will become more apparent to those of ordinary skill in the art by describing in detail preferred example embodiments thereof with reference to the attached drawings, in which.

DETAILED DESCRIPTION OF EXAMPLE EMBODIMENTS

Hereinafter, example embodiments of the present invention will be described in detail.

However, it should be understood that the embodiment is not meant to restrict the invention to specific forms of the present invention but rather the present invention is meant to cover all modifications, similarities and alternatives which are included in the spirit and scope of the present invention.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned to be "connected" to or "accessing" another component, this may mean that it is directly connected to or accessing the other component, but it is to be understood that another component may exist in-between. On the other hand, when a component is mentioned to be "directly connected" to or "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

The present example embodiments are provided for complete disclosure of the present invention and to fully inform the scope of the present invention to those ordinarily skilled in the art. The like reference symbols indicate the same or similar components.

Figure 2:
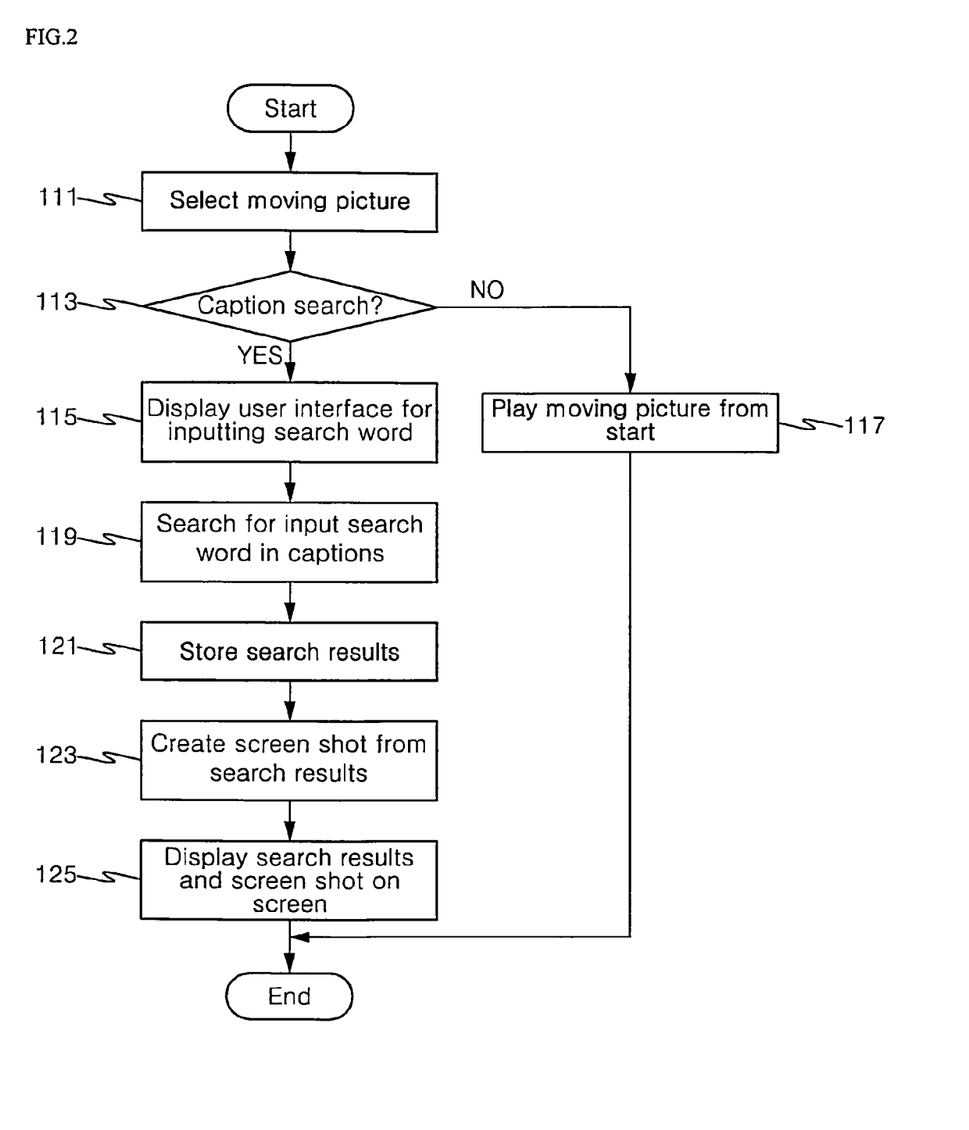
FIG. 2 is a flowchart illustrating a caption search process according to an example embodiment of the present invention.
Figure 3:
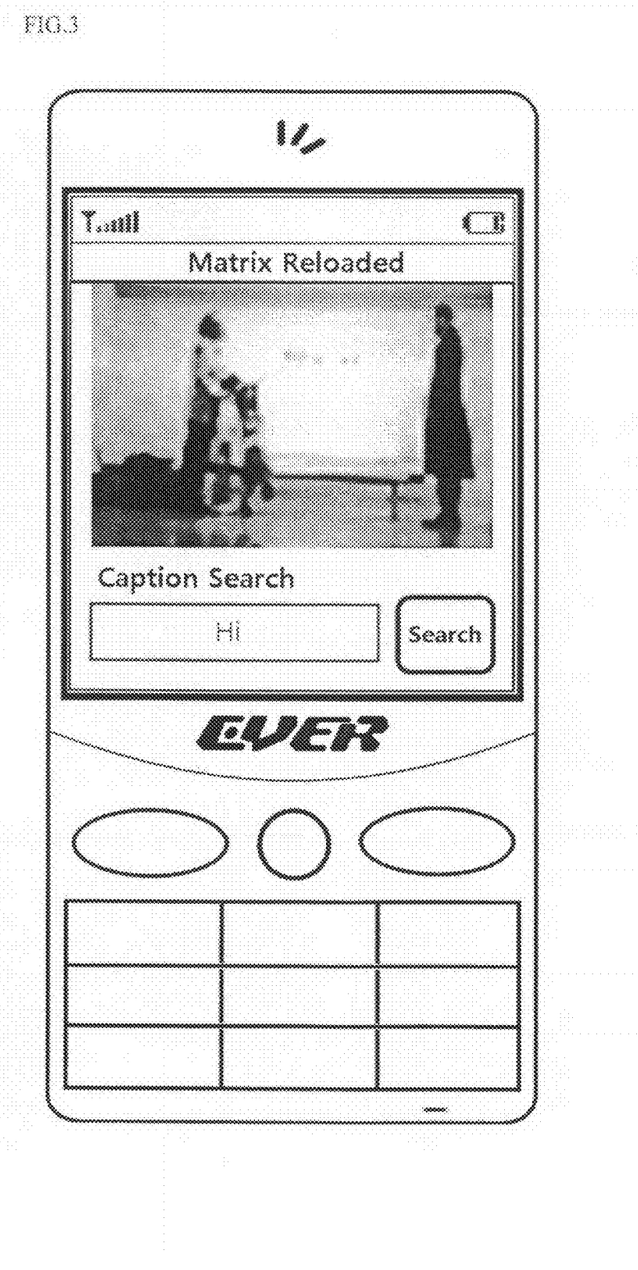
FIG. 3 illustrates a user interface screen used to input a search word in the caption search process in FIG. 2.
Figure 4:
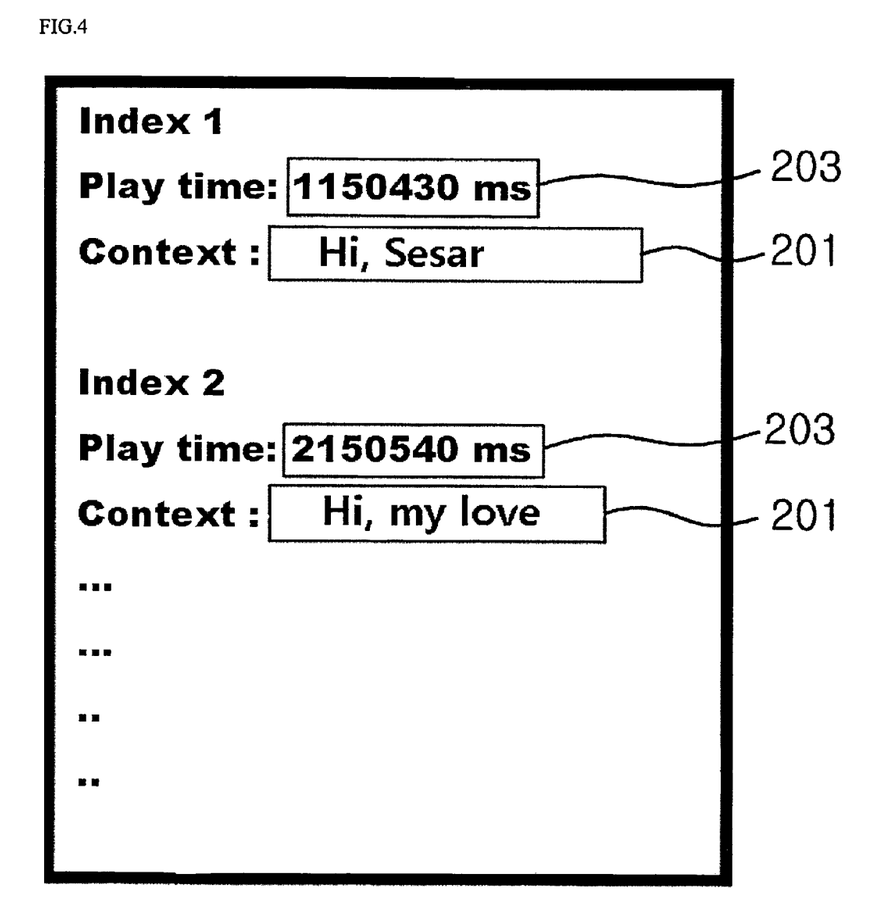
FIG. 4 illustrates result data searched for in the caption search process in FIG. 2.
Figure 5:
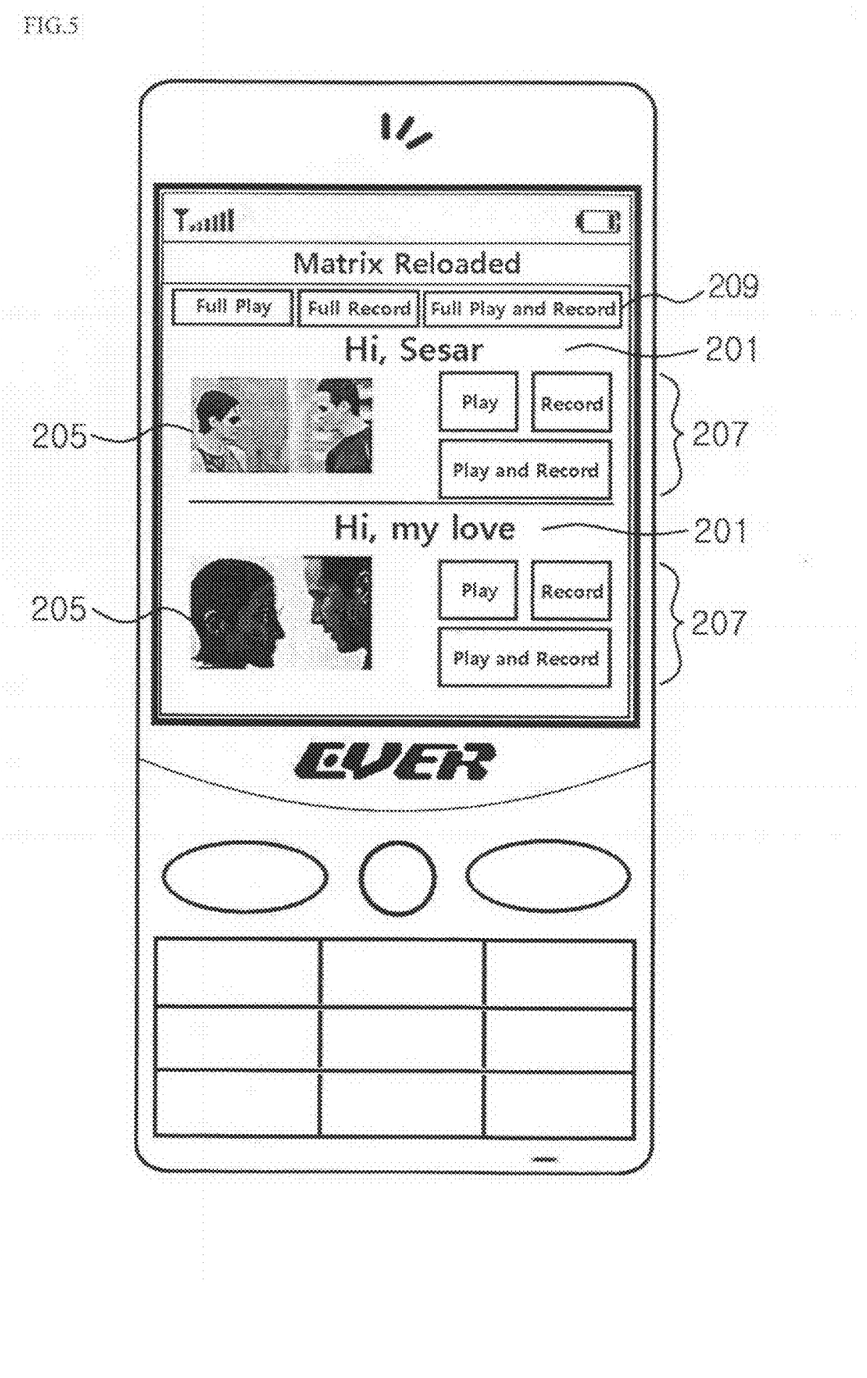
FIG. 5 illustrates a user interface screen showing a caption search results in the caption search process shown in FIG. 2.

FIG. 2 is a flowchart illustrating a caption search process according to an example embodiment of the present invention, and FIG. 3 illustrates a user interface screen used to input a search key word in the caption search process of FIG. 2. FIG. 4 illustrates searched data in the caption search process of FIG. 2, and FIG. 5 illustrates a user interface screen showing a caption search results obtained in the process shown in FIG. 2.

Referring to FIGS. 2 through 5, first, a user selects a moving picture desired to be played (step 111) and determines whether a caption for the selected moving picture is to be searched for. Here, the user may activate a caption search function by using a user menu or a separate hot key.

A portable device determines whether the user activates the caption search function (step 113). When it is determined that the user activates the caption search function, the portable device displays a user interface for caption search shown in FIG. 3 on a display screen (step 115).

When it is determined in step 113 that the user does not activate the caption search function, the portable device plays the moving picture, selected in step 111, from a start of the moving picture (step 117).

The user inputs a search key word through the user interface displayed on the display screen in step 115, and the portable device searches for a caption corresponding to the search key word among the captions of the moving picture (step 119). Here, the portable device searches for the search key word, or search for a caption including the search key word and a time during which the search key word is displayed, i.e., a moving-picture play time-point 203, among the captions of the moving picture. The caption including the search key word indicates a caption displayed at a predetermined time among all captions of the moving picture.

The portable device then stores the search results (step 121). Here, the search results includes the user-input search key word or the caption 201 including the search key word, and a play time-point 203 at which the search key word or the caption including the search key word are displayed, as shown in FIG. 4. The caption 201 including the search key word and the moving-picture play time-point 203 are associated with each other and are indexed.

The portable device may store the search results in various forms, such as a text file or an eXtensible Markup Language (XML) file.

The portable device may generate a screen shot for the moving picture corresponding to the time point at which the search key word is displayed by using the search results stored in step 121 (step 123). Here, the generated screen shot may be stored with an associated index.

For example, the portable device may play a moving picture from each play time-point included in the search result, decode the played data to generate a predetermined frame, i.e., a screen shot, and store the play time-point and the generated screen shot corresponding to the play time-point.

The portable device then generates a user interface screen using the search results and the screen shot and displays the generated user interface screen on the display screen (step 125).

For example, the portable device may //index// a caption 201 corresponding to the user-input search key word and a screen shot 205 corresponding to a play time-point at which the caption is displayed, and display the caption 201 corresponding to the user-input search key word and the screen shot 205 corresponding to the play time-point on the user interface screen, as shown in FIG. 5. The portable device may also display a play/record button 207 for selectively playing and/or recording the items included in the search result, and a fill play/record button 209 for playing all the items included in the search results and/or recording the items as one moving picture.

The caption search process according to an example embodiment of the present invention as shown in FIG. 2 include generating the screen shot using the search results and displaying the generated screen shot on the search-result list. In other example embodiments of the present invention, the caption search process may include displaying the search-result list including the searched caption and/or the play time-point in a text form on the user interface screen for selection by the user, instead of generating the separate screen shot.

As shown in FIGS. 2 to 5, the method of playing/recording a moving picture using caption search according to an example embodiment of the present invention includes searching for a caption based on a user-input search key word, //indexing// the search result, and then displaying the same on the user interface screen. The user may select a desired item in the indexed search results so that the moving picture is played and/or recorded from a desired location. Also, in an example embodiment of the present invention, all items included in the search results may be recorded as one moving-picture file or played sequentially.

Figure 6:
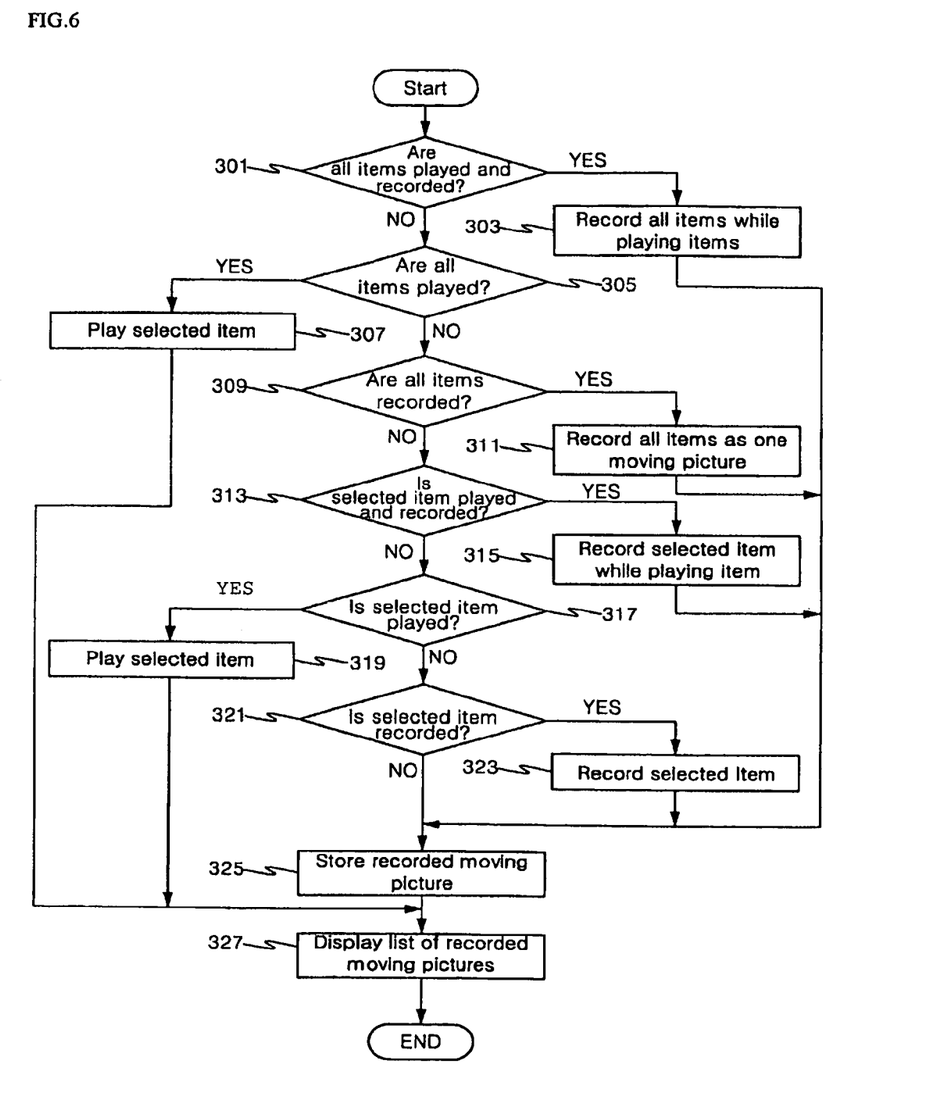
FIG. 6 is a flowchart illustrating a moving-picture playback/recording process using caption search according to an example embodiment of the present invention.

FIG. 6 is a flowchart illustrating a moving-picture playback/recording process using caption search according to an example embodiment of the present invention. Here, it is assumed that a search-result list corresponding to a user-input search key word is displayed on the display unit for the portable device as shown in FIG. 5.

First, the portable device determines whether an event instructing to play and to record all the items in the search-result list shown in FIG. 5 occurs (step 301). When it is determined that the event instructing to play and to record all the items occurs, the portable device sequentially records all the items included in the search-result list while playing the items (step 303). Here, the event instructing to play and to record may occur when the user selects the full play/record button on the user interface screen that displays the search-result list, as shown in FIG. 5.

Each item included in the search-result list may be played for a previously set time or a user-set time. For example, when the user sets a play time for each item to three minutes, the item is played and recorded for three minutes from a play start time.

When it is determined in step 301 that the event instructing to record and to display all the items does not occur, the portable device determines whether an event instructing to play all the items occurs (step 305). When it is determined that the event instructing to play all the items occurs, the portable device sequentially plays all the items included in the search-result list (step 307). Here, the event instructing to play all the items may occur when the user selects the full play button on the user interface screen that displays the search-result list, as shown in FIG. 5.

When it is determined in step 305 that the event instructing to play all items does not occur, the portable device determines whether an event instructing to record all the items occurs (step 309). When it is determined that the event instructing to record all the items occurs, the portable device sequentially records all the items included in the search-result list (step 311). Here, the event instructing to record all items may occur when the user selects the full record button on the user interface screen displaying the search-result list, as shown in FIG. 5.

Here, in steps 303 and 311, all the items included in the search-result list may be recorded as one moving-picture file, and the caption included in each item may be mixed with a moving picture corresponding to each caption upon recording, such that there may be no separate caption file in the recorded moving picture.

When it is determined in step 309 that the event instructing to record all items does not occur, the portable device determines whether an event instructing to play and to record an item selected by the user occurs (step 313). When it is determined that the event instructing to play and to record the selected item occurs, the portable device records the selected item while playing the item (step 315). Here, the event instructing to play and to record the item may occur by selecting the play and record button for each item on the user interface screen that displays the search-result list, as shown in FIG. 5.

When it is determined in step 313 that the event instructing to play and to record the selected item does not occur, the portable device determines whether an event instructing to play the item selected by the user occurs (step 317). When it is determined that the event instructing to play the selected item occurs, the portable device plays the selected item (step 319). Here, the event instructing to play the selected item may occur by selecting the play record button for each item on the user interface screen that displays the search-result list, as shown in FIG. 5.

When it is determined in step 317 that the event instructing to play the selected item does not occur, the portable device determines whether an event instructing to record the item selected by the user occurs (step 321). When it is determined that the event instructing to record the selected item occurs, the portable device records the selected item (step 323). Here, the event instructing to record the selected item may occur by selecting the record button for each item on the user interface screen that displays the search-result list, as shown in FIG. 5.

In steps 303, 311, 315 and 323, each recorded moving picture is stored in a storage unit of the portable device (step 325), and the portable device displays a list of the recorded moving pictures on the display unit of the portable device (step 327).

In FIG. 6, when the user selects one or more of the items included in the search-result list and activates play and/or record, steps 313 to 325 may be repeatedly performed.

Figure 7:
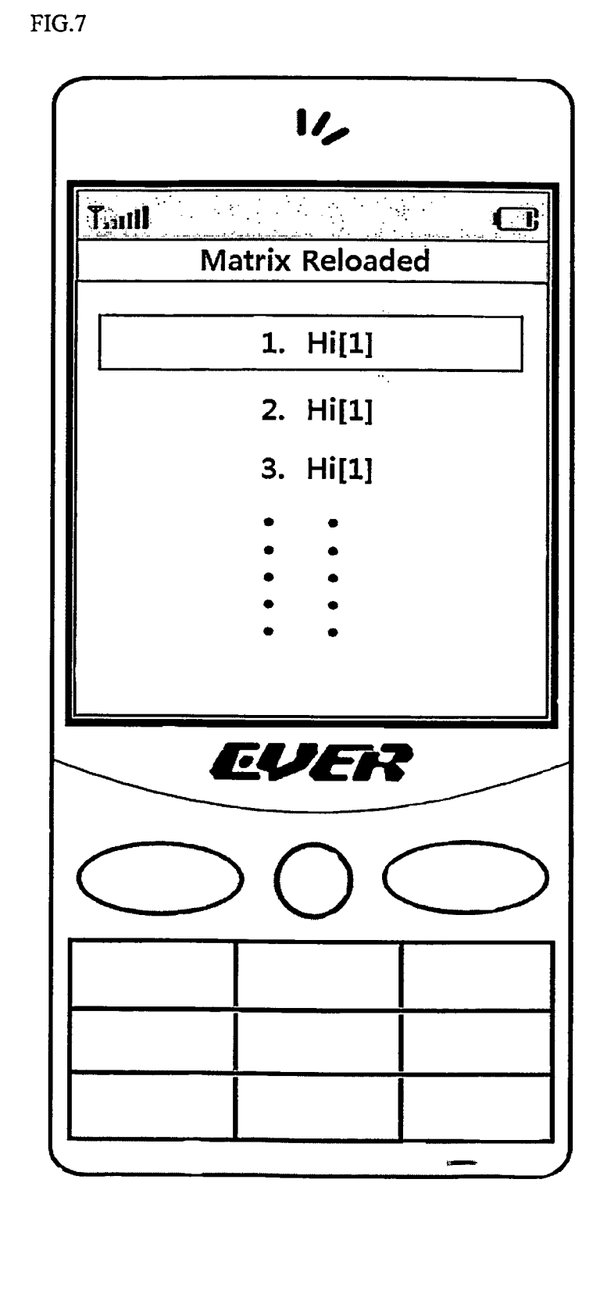
FIG. 7 illustrates a user interface screen showing a list of moving pictures recorded through the moving-picture playback/recording process using caption search shown in FIG. 6.

FIG. 7 illustrates a user interface screen showing a list of moving pictures recorded through the moving-picture playback/recording process using caption search in FIG. 6.

Referring to FIG. 7, a list of recorded moving pictures is displayed on the display unit of the portable device in response to a user's selection, and the user selects a desired item from the list to play the selected desired item.

When the user selects a full record in the moving-picture playback/recording process shown in FIG. 6, all the items included in the search-result list are recorded as one moving picture. Accordingly, only one moving-picture item may be displayed in the moving-picture list on the display unit. When the user individually searches for and records the respective items, a number of moving-picture items corresponding to the items in the search-result list selected by the user may be displayed in the moving-picture list.

Figure 8:
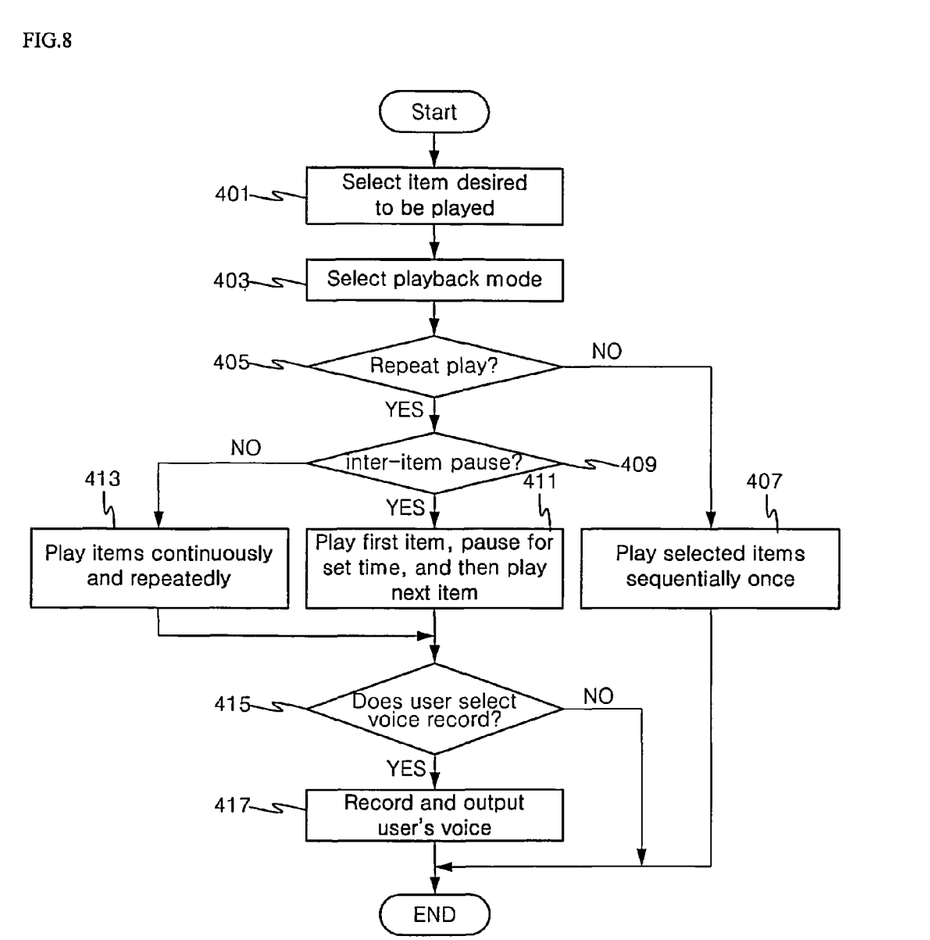
FIG. 8 is a flowchart illustrating a process of playing a moving picture using caption search according to another example embodiment of the present invention.

FIG. 8 is a flowchart illustrating a process, which is applied to foreign-language learning, of playing a moving picture using caption search according to another example embodiment of the present invention.

First, the user selects at least one item desired to be played on the user interface screen that displays the search-result list, as shown in FIG. 5 (step 401).

Here, the user may selectively play the items in the search-result list or play all the items. The item represents each of search results item in the search-result list displayed on the user interface screen, as shown in FIG. 5. The item includes a caption, and a time-point at which the caption is displayed or a screen shot corresponding to the time-point at which the caption is displayed, which means a predetermined play location or time-point in the moving picture.

For example, the portable device //indexes// the caption 201 corresponding to the user-input search key word, the screen shot 205 corresponding to the play time-point at which the caption is displayed, and the tool 207 for moving-picture play, and displays the same on the user interface screen, as shown in FIG. 5.

The user then selects a playback mode for the at least one selected item (step 403). Here, the user may select one of various modes, including a repeat play, a sequential play and a random play, for the at least one selected item, through a menu or by using the hot key of the portable device.

The portable device determines whether the user selects the repeat play among the playback modes (step 405). When it is determined that the user does not select the repeat play, the portable device plays user-selected items sequentially only once (step 407).

When it is determined in step 405 that the user selects the repeat play, the portable device determines whether the user selects an inter-item pause function (step 409).

When it is determined in step 409 that the user selects the inter-item pause function, the portable device plays each item included in the at least one item selected by the user, pauses for a previously set time, and then plays the next item (step 411). For the pause time, the user can practice a foreign language by pronouncing words of the moving picture.

When it is determined in step 409 that the user does not select the inter-item pause function, the portable device plays at least one item selected by the user continuously and repeatedly (step 413).

The portable device also determines whether the user selects a voice recording function (step 415). When the user selects the voice recording function, the portable device records user's voice and outputs the recorded voice (step 417). Here, the user's voice may be recorded upon playback of the user-selected item or at any time. According to the user's selection, the recorded voice may be output via a speaker of the portable device or earphones as soon as the voice is recorded or for the pause time after each item is played, as in step 411.

In the process of playing a moving picture using caption search according to another example embodiment of the present invention shown in FIG. 8, each item selected by the user may be played for a predetermined time based on a user-defined or previously set value. For example, each item included in at least one item in the search-result list selected by the user may be played for three minutes (set as the play time by the user) from a time-point at which the searched caption or the screen shot is displayed.

As shown in FIG. 8, the process of playing a moving picture using caption search according to another example embodiment of the present invention provides a user-friendly foreign-language learning function by generating a screen shot, which corresponds to a caption, which corresponds to a user-input search key word among captions of a moving picture, and a time-point at which a caption is displayed to display the search-result list, and by sequentially or repeatedly playing a user-selected item in the displayed search-result list according to a user-selected playback mode. The process can also provide a function of comparison of original foreign language pronunciation included in the moving picture with the user's pronunciation by recording and outputting the user's voice via the microphone and the speaker of the portable device.

Figure 9:
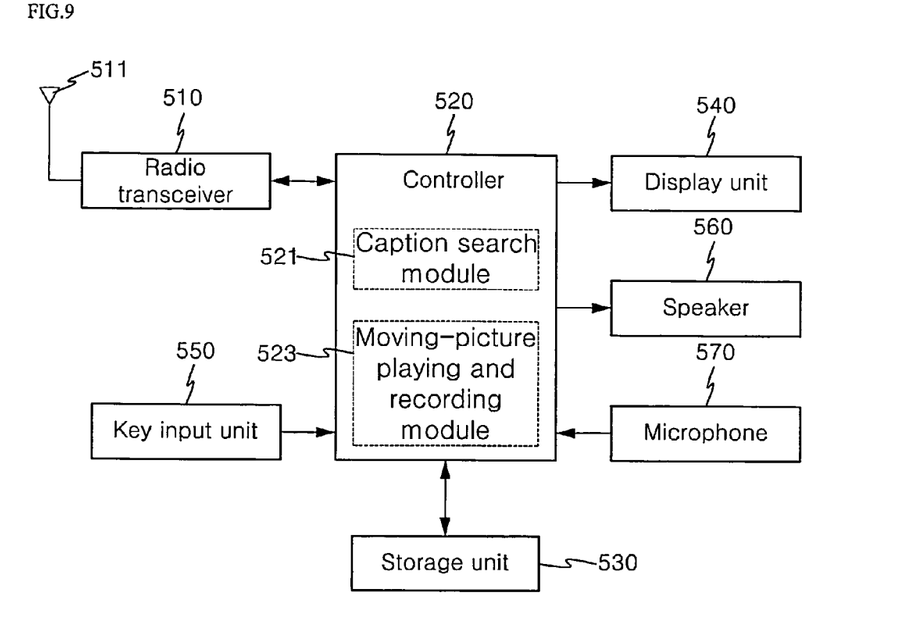
FIG. 9 is a block diagram illustrating a portable device having a function of playing and recording a moving picture using caption search according to an example embodiment of the present invention.

FIG. 9 is a block diagram illustrating a portable device having a function of playing and recording a moving picture using caption search according to an example embodiment of the present invention.

Referring to FIG. 9, the portable device according to an example embodiment of the present invention includes a radio transceiver 510, a controller 520, a storage unit 530, a display unit 540, a key input unit 550, a speaker 560, and a microphone 570.

The radio transceiver 510 may include a duplexer, a radio-frequency processor, and an intermediate frequency processor. The radio transceiver 510 receives a radio frequency (RF) signal induced by an antenna 511 via the duplexer, converts the received radio frequency signal into an intermediate frequency and then into a base band signal, and provides the base band signal to the controller 520. Also, the radio transceiver 510 converts the base band signal provided from the controller 520 into an intermediate frequency signal and then into a radio frequency signal, and provides the radio frequency signal to the antenna 511 via the duplexer.

Alternatively, the radio transceiver 510 may use a direct conversion method to directly demodulate a signal from a received radio frequency signal without frequency conversion, instead of using a heterodyne receiving method to demodulate a base band signal with conversion from a radio frequency signal into an intermediate frequency signal, as described above.

The controller 520 performs controlling and processing for unique functions and voice communication of the portable device. The controller 520 may include a base band processor for processing the base band signal provided from the radio transceiver 510. The controller 520 may also include a vocoder for digital processing of transmitted and received voice.

The controller 520 also provides a user interface used to input a search key word for caption search, searches for a caption based on the user-input search key word, indexes the search results, displays a search-result list on the screen, and plays and/or records all items or a user-selected item in the displayed search-result list according to a playback and/or recording mode.

When the user selects a voice recording function, the controller 520 stores a user voice signal input via the microphone 570, and outputs the stored user voice via the speaker 560 at a user-selected time or a previously set time.

The controller 520 may include at least one CODEC for playing a moving picture. The controller 520 may also include a caption search module 521 and a moving-picture playing and recording module 523 for searching for a caption and playing and/or recording the moving picture.

When a moving picture is selected by the user and a caption search function is activated, the caption search module 521 displays a user interface for caption search on the display unit 540, searches for the user-input search key word or a caption including the search key word in the storage unit 530, //indexes// the searched caption and a corresponding play time-point at which the searched caption is displayed, and stores the indexed search-result list in the storage unit 530.

The caption search module 521 may create a screen shot of the moving picture corresponding to the time-point at which the search key word is displayed by using the indexed search-result list. Here, the created screen shot may be stored in an index including the time-point at which the screen shot is played.

The caption search module 521 forms a user interface screen for playing and/or recording by using the search results and the screen shot, and displays the formed user interface screen on the display unit 540.

When the user instructs to play and record all items in the search-result list displayed on the display unit 540, the moving-picture playing and recording module 523 records all the items included in the search results list as one moving-picture file while playing the items. Here, each item included in the search-result list is played and recorded for a previously set time. For example, assuming the search-result list includes 10 items and a play and record time of each item is set to three minutes, when the user activates full play and record, each item is played and recorded for three minutes from the caption display time and 10 items are recorded as one moving-picture file with a play time-point of 30 minutes.

When the user selects an item in the search-result list and activates record and play, the moving-picture playing and recording module 523 records the user-selected item while playing the same. When the user selects an item and activates either record or play, the moving-picture playing and recording module 523 records or plays the user-selected item.

The moving-picture playing and recording module 523 stores the moving picture recorded according to the user-selected method in the storage unit 530, and displays a list of the recorded moving pictures on the display unit 540. When the user selects a moving-picture item in the moving-picture list displayed on the display unit 540, the moving-picture playing and recording module 523 reads the selected moving-picture item from the storage unit 530 and plays the item.

When the user selects at least one item in the search-result list displayed on the display unit 440 and selects a playback mode, the moving-picture playing and recording module 523 plays each item according to the selected playback mode.

For example, when the user selects at least one item in the search-result list, selects the repeat play as the playback mode, and selects an inter-item pause function, the moving-picture playing and recording module 523 repeatedly plays the at least one item selected by the user and pauses for a previously set time between items.

When the user voice recording function is selected, the moving-picture playing and recording module 523 stores a user voice signal input from the microphone 470 in the storage unit 430 and outputs the stored user voice via the speaker 460 at a user-selected time or a previously set time.

The caption search module 521 and the moving-picture playing and recording module 523 may be implemented by a software program and executed by a processor included in the controller 520 (e.g., a base band processor) or a separate processor (e.g., an application processor).

The storage unit 530 may include a non-volatile memory, such as a flash memory or an Electrically Erasable And Programmable Read Only Memory (EEPROM). The storage unit 530 stores a system program (e.g., an operating system) and/or any other application programs required for basic operation of the portable device. The storage unit 530 may store the user-input data, and data generated while the system program and/or application program is being executed.

In particular, the storage unit 530 stores the search-result list indexed by the caption search module 521, and stores a moving-picture file including all items or selected items included in the search-result list.

The display unit 540 may be, for example, a display device such as a Liquid Crystal Display (LCD) or an Organic Light Emitting Display (OLED). The display unit 540 displays a user interface, such as menus, an operation state, an application-program execution screen, and the like, of the portable device, based on an image signal provided from the controller 520.

In particular, under control of the controller 520, the display unit 540 displays the user interface for caption search and the search-result list or the recorded moving-picture list indexed by the controller 520.

The key input unit 550 includes a plurality of numerical and character keys, and function keys for special functions. When a key is operated by the user, the key input unit 550 provides a corresponding key input signal to the controller 520.

In particular, when a caption search key is operated by the user, the key input unit 550 provides a corresponding key event to the controller 520. Also, when a key instructing to play and/or record an item included in the search-result list is operated by the user, the key input unit 550 provides an event signal corresponding to the operated key to the controller 520.

The speaker 560 outputs a voice signal provided from the controller 520 upon voice communication. Upon playback of the moving picture, the speaker 560 also outputs a sound signal provided from the controller 520 as an audio signal in an audible frequency band.

The microphone 570 receives user's voice in voice communication, converts the input voice to a corresponding electric signal, and provides the electric signal to the controller 520.

While the portable device has been described as a mobile communication device, the method of playing/recording a moving picture using caption search may also be applied to various other portable devices, such as a personal digital assistant (PDA), a portable multimedia player(PMP), an MP3 player, and the like.

While the method of playing/recording a moving picture using caption search has been described as applied to a portable device, the method of playing/recording the moving picture using caption search may also be applied to various image processing apparatuses having a function of playing and recording a moving picture using caption search, such as a personal computer (PC), a laptop computer, a web server, and a multimedia processing device.

As described above, according to the methods of playing/recording a moving picture using caption search and image processing apparatuses using the same, the user-input search key word is searched for among the captions of the selected moving picture, the search results is indexed, and a search-result list is displayed. The moving picture is played or recorded from a predetermined location according to a user-selected item in the displayed search-result list and a user-selected playback and/or recording method. Each recorded item may be stored as a moving-picture file, a list of the recorded moving pictures is displayed on the display unit, and a selected moving picture is played. The user-selected item in the displayed search-result list is played according to a user-selected playback mode, and a user's voice is recorded and output.

Accordingly, a desired portion of a moving picture can be played and/or recorded through the caption search. As the moving picture can be played from a desired location using the caption search, efficient foreign-language learning is possible. Furthermore, since the searched portion can be recorded, stored as a separate moving-picture file, and played, repetitive foreign-language learning using the recorded moving-picture file may be possible even in a typical playing device capable of playing a moving-picture file.

As the selected item can be played according to the user-selected playback mode and a user's voice can be recorded and output, efficient foreign-language learning is possible.

While the invention has been shown and described with reference to certain example embodiments thereof, it will be understood by those skilled in the art that various changes in form and details may be made therein without departing from the spirit and scope of the invention as defined by the appended claims.

What is claimed is:

1. A method of recording a moving picture using a caption search in a portable device, the method comprising:
   searching, using the portable device, for a caption corresponding to a search key word among captions of the moving picture based on the search key word;
   displaying, using the portable device, search-result list; and
   recording, using the portable device, at least one item included in the displayed search-result list according to a selected recording mode, wherein the recording, using the portable device, at least one item included in the displayed search-result list according to a selected recording mode includes recording all items included in the search-result list while playing the all items and recording all the items included in the search-result list as one moving-picture file, and mixing the caption included in each item of the search-result list with the one moving-picture file corresponding to the caption when an event instructing full play and record occurs,
   wherein the displaying search-result list includes displaying menu buttons, each of the menu buttons configured to select a recording mode among a plurality of recording modes, respectively, the recording mode indicating a way of recording at least one search result included in the search-result list,
   wherein the recording at least one item included in the displayed search-result list according to a selected recording mode includes recording by the portable device, when an event instructing a play and a record occurs, a selected one of the items included in the search-result list while playing the selected item,
   wherein the recording modes include play or record all items included in the search-result list, play and record all items included in the search-result list, play or record an item in the search-result list, and play and record an item included in the search-result list.

2. The method according to claim 1, further comprising:
   storing, using the portable device, at least one moving picture recorded according to the selected recording mode on a storage device; and
   displaying, using the display unit, a list of the stored at least one moving picture on a display unit.

3. An image processing apparatus having a function of recording a moving picture using caption search, the apparatus comprising:
   a controller configured to search for a caption corresponding to a search key word among captions of the moving picture based on the search key word, configured to display a search-result list, and configured to record at least one item included in the displayed search-result list according to a selected recording mode, wherein the controller mixes, when the event instructing the full play and the record occurs, the caption included in each item of the search-result list with the moving picture corresponding to the caption; and
   a storage unit configured to store the recorded at least one item,
   wherein the controller records, when an event instructing a full play and a record occurs, all items included in the search-result list as one moving-picture file while playing the items,
   wherein the controller is configured to display menu buttons, each of the menu buttons configured to select a recording mode among a plurality of recording modes, respectively, the recording mode indicating a way of recording at least one search result included in the search-result list,
   wherein the controller records, when an event instructing to play a selected item and to record the selected item occurs, a selected item of the items included in the search-result list while playing the selected item,
   wherein the recording modes include play or record all items included in the search-result list, play and record all items included in the search-result list, play or record an item in the search-result list, and play and record an item included in the search-result list.

* * * * *